United States Patent
Jenkins et al.

(10) Patent No.: US 7,057,123 B1
(45) Date of Patent: Jun. 6, 2006

(54) SAFETY INTERLOCK FOR CIRCUIT BREAKER HOUSING ASSEMBLY AND EXTRACTION DEVICE

(75) Inventors: Walter Oliver Jenkins, Pittsburgh, PA (US); Francois Jean Marchand, Morris, NJ (US); Robert Nicholas Krevoklich, West Newton, PA (US); John Joseph Hoegle, Beaver, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/057,566

(22) Filed: Feb. 14, 2005

(51) Int. Cl.
*H02B 11/00* (2006.01)

(52) U.S. Cl. .................... 200/50.23; 361/606; 361/609

(58) Field of Classification Search ............ 200/50.01, 200/50.02, 50–17, 50.21–50.27; 218/155; 361/601, 615, 606–609, 723–727
See application file for complete search history.

(56) References Cited

U.S. PATENT DOCUMENTS

| | | | |
|---|---|---|---|
| 4,002,864 A | 1/1977 | Kuhn et al. | |
| 4,017,698 A | 4/1977 | Kuhn et al. | |
| 4,486,814 A * | 12/1984 | Ishikawa et al. | 361/609 |
| 5,486,978 A | 1/1996 | Fishovitz | |
| 6,066,814 A * | 5/2000 | Smith et al. | 200/50.24 |
| 6,400,245 B1 | 6/2002 | Castonguay et al. | |
| 6,445,570 B1 * | 9/2002 | Leccia | 361/605 |
| 6,590,170 B1 * | 7/2003 | Jenkins | 200/50.21 |
| 6,884,949 B1 * | 4/2005 | Yoon | 200/50.26 |

* cited by examiner

*Primary Examiner*—Marina Fishman
(74) *Attorney, Agent, or Firm*—Martin J. Moran

(57) ABSTRACT

An interlock assembly for a circuit breaker housing assembly and a circuit breaker extraction device wherein the interlock assembly has a first and second component. The first component is coupled to a circuit breaker housing assembly and the second component is coupled to a circuit breaker extraction device. The first component includes a rail obstruction assembly that is structured to move between a first position, wherein the movable rail obstruction element blocks a circuit breaker wheel from traveling over a circuit breaker housing assembly rail, and a second position, wherein the movable rail obstruction element is spaced from the circuit breaker housing assembly rail so that a wheel may travel over the circuit breaker housing assembly rail. The second component is structured to engage the first component when the circuit breaker extraction device is brought adjacent to the circuit breaker housing assembly and to move the movable rail obstruction element from the first position to the second position.

20 Claims, 4 Drawing Sheets

SAFETY INTERLOCK FOR CIRCUIT BREAKER HOUSING ASSEMBLY AND EXTRACTION DEVICE

BACKGROUND OF THE INVENTION

1. Field of the Invention

The present invention relates to a circuit breaker extraction device and, more specifically, to an interlock assembly having components on both the circuit breaker cell and the extraction device which are structured to prevent the circuit breaker from being removed from the cell unless the cell and the extraction device are locked together.

2. Background Information

Large circuit breakers are typically disposed in an enclosure or housing assembly. The circuit breaker, which may weigh as much as 1000 lbs., is typically disposed on a set of rollers, or a circuit breaker frame having rollers. The rollers are structured to engage a pair of rails extending from the front to the back of the housing assembly. The rollers and/or the housing assembly rails typically include a break or similar device structured to prevent the circuit breaker from moving. In this configuration, the circuit breaker may be inserted and removed from the housing assembly with little difficulty.

The circuit breaker, being heavy, is typically removed onto a movable cart, or a pallet that may be lifted by a hand truck, so that the circuit breaker may be further transported. Typically, the cart or pallet includes a pair of rails that are structured to align with the housing assembly rails. This type of cart is identified as an extraction device. Generally, the extraction device is placed in front of the housing assembly with the extraction device rails aligned with the housing assembly rails and with the extraction device brakes set. The circuit breaker roller brake is released and the circuit breaker is rolled out of the housing assembly onto the extraction device rails. Once the circuit breaker is on the extraction device, the circuit breaker brake device is reset and the extraction device brakes are released. At this point, the circuit breaker may be transported on the extraction device. Installation of a circuit breaker is essentially the same procedure in reverse. It is further noted that the housing assembly may be structured to hold a circuit breaker at a height above the floor, for example, some housing assemblies hold two or more circuit breakers in a stacked configuration.

The disadvantage to this system is that a circuit breaker may be removed when no extraction device is present or when the extraction device is not properly aligned. That is, it is known that technicians may simply release the brakes on the circuit breaker and pull the circuit breaker from the housing assembly while relying on their strength to support the circuit breaker. Technicians are also known to manually lift a circuit breaker to install the circuit breaker in a housing assembly. This procedure, especially when performed by a single person, is likely to cause injury to the technician and damage to the circuit breaker. There is, therefore, a need for an interlock assembly structured to operate between the circuit breaker housing assembly and extraction device that is structured to prevent the removal or installation of a circuit breaker from a housing assembly without an extraction device. There is a further need for an interlock assembly that locks the extraction device to the circuit breaker housing assembly.

SUMMARY OF THE INVENTION

These needs, and others, are met by the present invention which provides an interlock assembly having a first component on the circuit breaker housing assembly and a second component on the extraction device. The first component includes a rail obstruction assembly that is structured to block the circuit breaker housing assembly rail and circuit breaker roller so that the circuit breaker may not be withdrawn from, or inserted into, the circuit breaker housing assembly. The rail obstruction assembly may be actuated so that the rail obstruction is temporarily removed. The second component, on the extraction device, is structured to actuate the rail obstruction assembly to move the rail obstruction element. The second component will only engage the first component when the extraction device rails are aligned with the circuit breaker housing assembly rails. Additionally, the first and second components include a locking device, such as a set of holes on each component that are aligned and a pin that is inserted therethrough. In a preferred embodiment, the first and second components are disposed on each circuit breaker housing assembly and extraction device rails.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
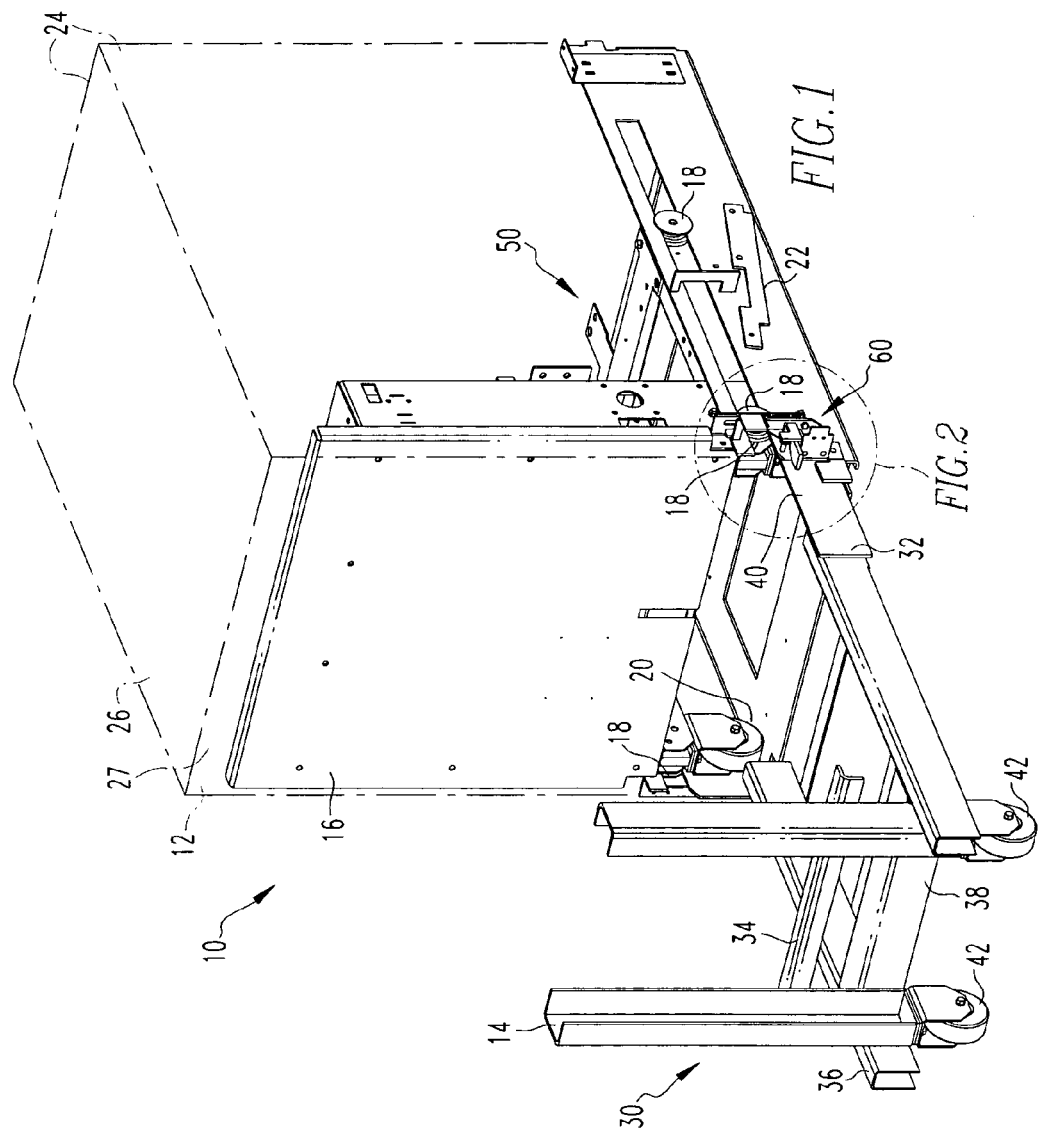
FIG. 1 is a schematic isometric view of a circuit breaker housing assembly and an extraction device.

As shown in FIG. 1, a circuit breaker removal and insertion assembly 10 includes a circuit breaker housing assembly 12 and a circuit breaker extraction device 14. The circuit breaker housing assembly 12 is structured to enclose a roll-out circuit breaker 16 (represented by a circuit breaker front panel). The roll-out circuit breaker 16 includes a set, preferably two pairs, of rail wheels 18 structured to engage, that is, roll on, a pair of rails 28 (described below). The roll-out circuit breaker 16 may also include a set of floor wheels 20. The circuit breaker housing assembly 12 includes a frame assembly 22 and a plurality of walls 24 forming an enclosure 26 having a front side 27, which is typically a door. Disposed within the enclosure 26 is a pair of generally parallel rails 28 structured to support a roll-out circuit breaker 16. The housing assembly rails 28 extend from the housing assembly front side 27 to the back side. In this configuration, the circuit breaker 16 may be rolled into, or out of, the enclosure 26 via the front side 27.

The circuit breaker extraction device 14 includes a frame assembly 30 structured to be mobile and having a pair of generally parallel rails 32 spaced to align with the circuit breaker housing assembly rails 28. The circuit breaker extraction device frame assembly 30 preferably forms a pallet 34 having two generally parallel inverted U-shaped channels 36. The U-shaped channel 36 may be upright or inverted. The U-shaped channels 36 are adapted to be engaged by the fork of a transportation device such as, but not limited to, a fork-lift. The pallet 34 further includes cross members 38 structured to hold the U-shaped channels 36 in a spaced, generally parallel relation. The circuit breaker extraction device rails 32 are coupled to the U-shaped channels 36. The circuit breaker extraction device rails 32 further have a distal end 40. The circuit breaker extraction device 14 may also be in the form of a cart which is similar to the pallet 34, but which further includes wheels 42.

Figure 2:
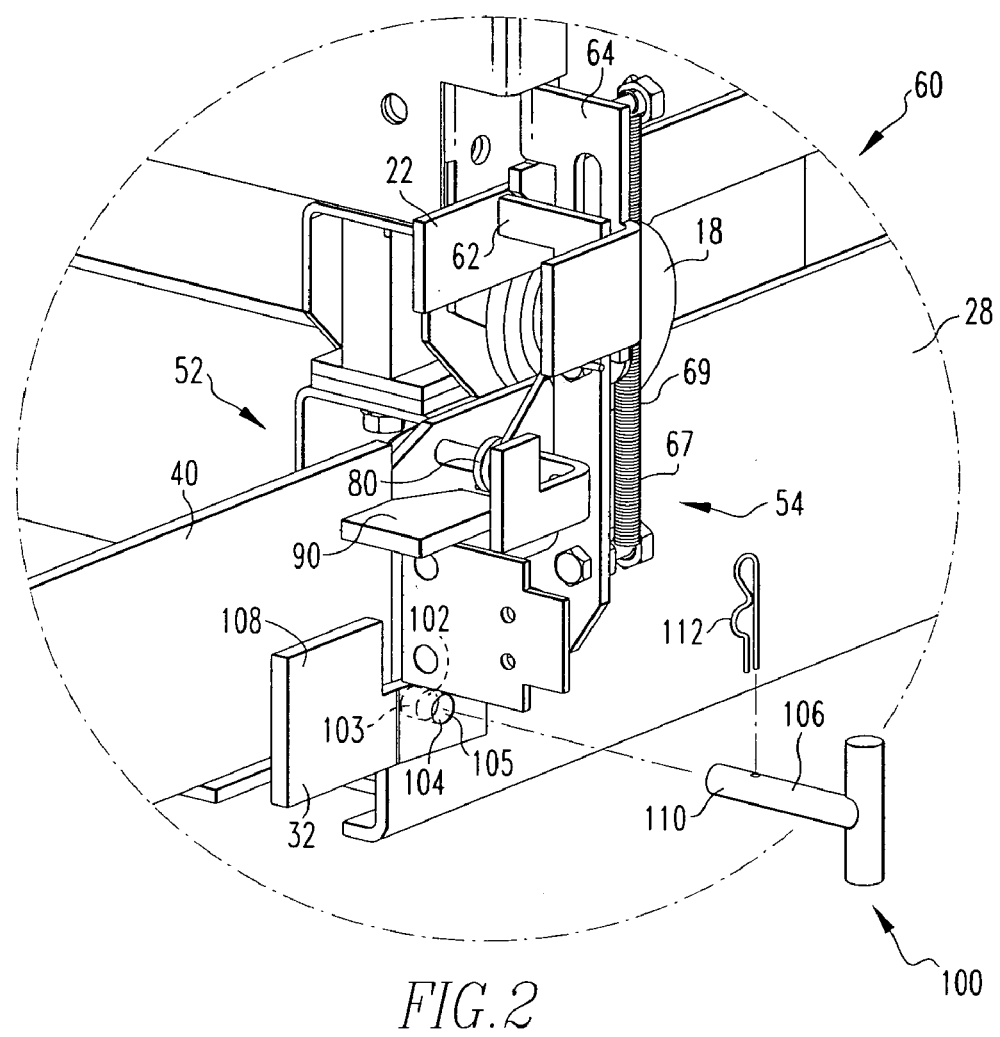
FIG. 2 is a detailed isometric front view of the interlock assembly.
Figure 3:
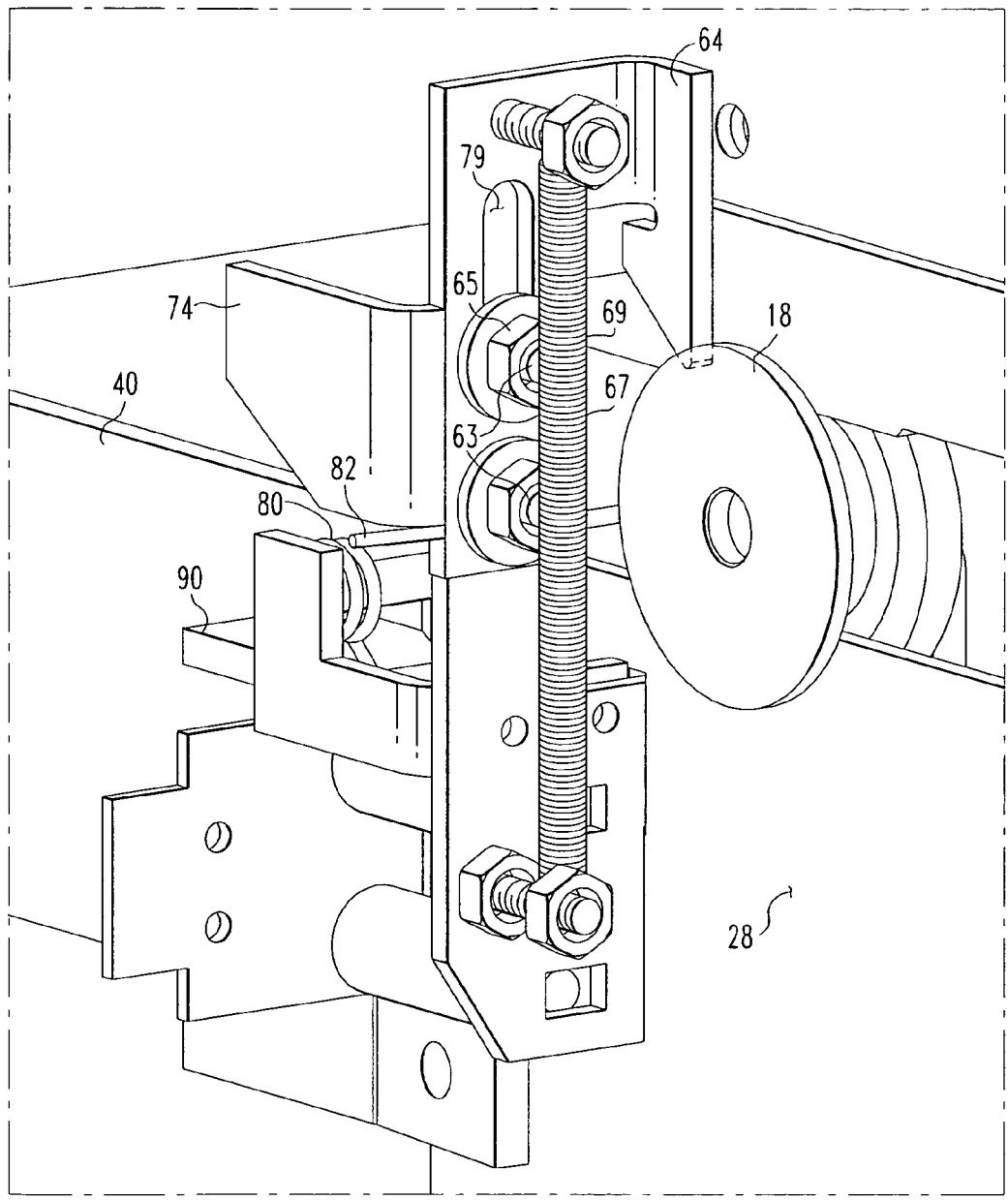
FIG. 3 is a detailed isometric back view of the interlock assembly.

As seen in FIGS. 2 and 3, an interlock assembly 50 having at least one first component 52 and at least one second component 54 is disposed on the circuit breaker housing assembly 12 and the circuit breaker extraction device 14. That is, the at least one first component 52 is coupled to the circuit breaker housing assembly 12 and the at least one second component 54 is coupled to the circuit breaker extraction device 14. The at least one first component 52 includes a rail obstruction assembly 60 disposed adjacent to at least one of the circuit breaker housing assembly rails 28. The rail obstruction assembly 60 has a fixed mount 62 coupled to the circuit breaker housing assembly 12 and a movable rail obstruction element 64. The rail obstruction element 64 is movably coupled to the fixed mount 62. The movable rail obstruction element 64 is structured to move between a first position, wherein the movable rail obstruction element 64 blocks a circuit breaker rail wheel 18 from traveling over the associated circuit breaker housing assembly rail 28, and a second position, wherein the movable rail obstruction element 64 is spaced from the associated circuit breaker housing assembly rail 28 so that a circuit breaker rail wheel 18 may travel over the circuit breaker housing assembly rail 28. Preferably, the movable rail obstruction element 64 moves vertically. The movable rail obstruction element 64 may also be coupled to a return device 67, such as a spring 69, coupled to a fixed point and to the movable rail obstruction element 64. The return device 67 is structured to bias the movable rail obstruction element 64 to the first position.

Figure 4:
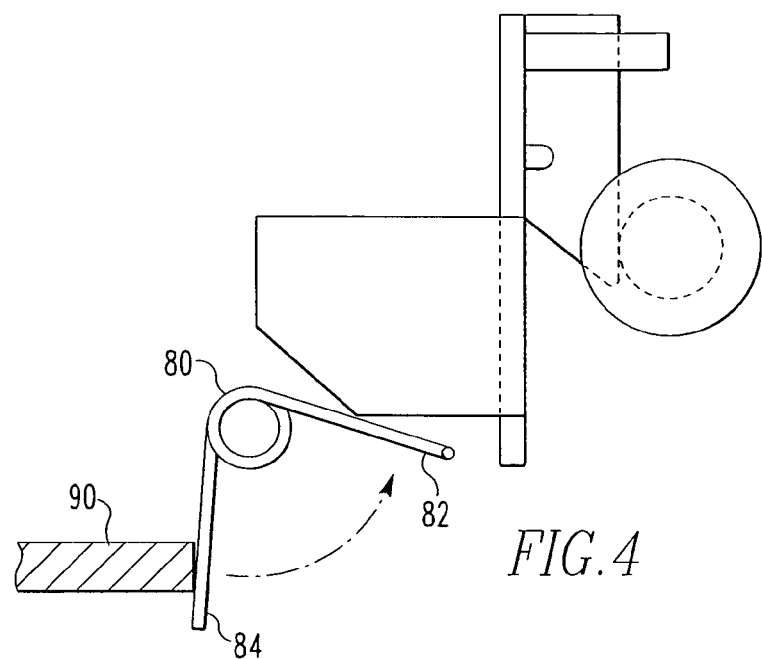
FIG. 4 is a schematic side view of the interlock assembly.
Figure 5:
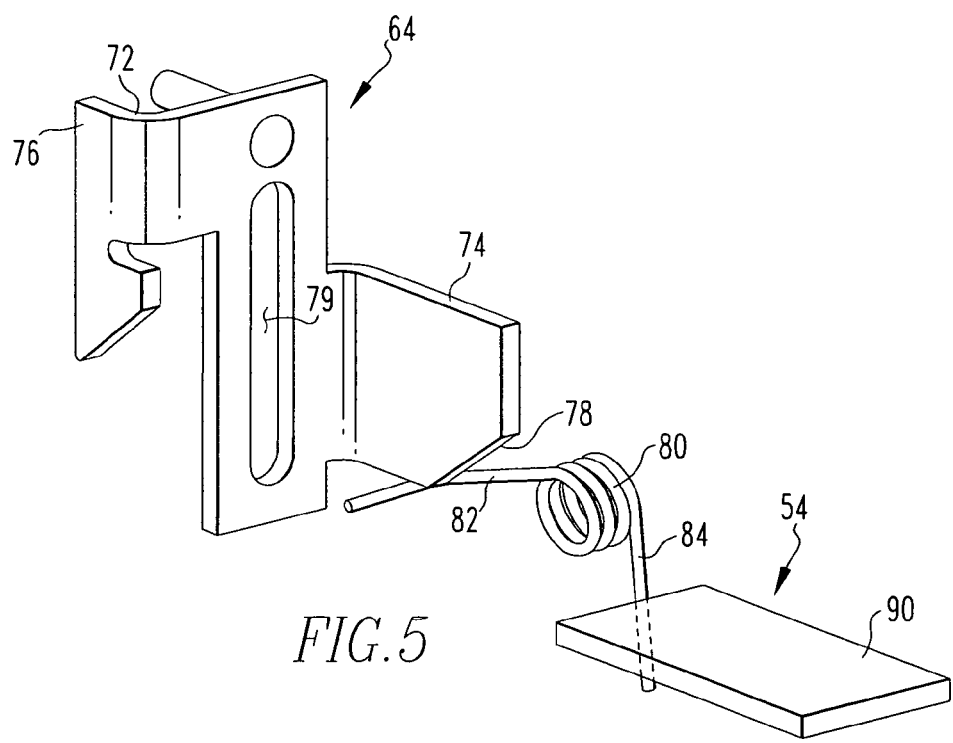
FIG. 5 is a schematic isometric view of the movable portions of the interlock assembly.

Preferably, as shown in FIGS. 4 and 5, the movable rail obstruction element 64 includes an elongated planar member 70 having a lateral extension 72 and a perpendicular extension 74. The lateral extension 72 is structured to extend over the circuit breaker housing assembly rail 28. The lateral extension 72 may further include a perpendicular portion 76 that is perpendicular to the planar member 70 and which extends, generally, parallel to the circuit breaker housing assembly rail 28 when the planar member 70 is installed. The perpendicular portion 76 improves the structural durability of the lateral extension 72. The perpendicular extension 74 is structured to extend toward the front side 27, or beyond the front side 27, of the circuit breaker housing assembly 12 when the planar member 70 is installed. The planar member 70 may have a slot 79 extending longitudinally that is structured to be coupled to the fixed mount 62, which, as shown in FIG. 3, may be a pair of threaded rods 63. The planar member 70 may be held on the threaded rods 63 by one or more nuts 65. The perpendicular extension 74 may have an angled lower edge 78. In one embodiment, the angled lower edge 78 is structured to be engaged by the interlock second component 54, as described below.

In another embodiment, the at least one first component 52 also includes a two-legged pivoting member 80 having a first leg 82 and a second leg 84. The two-legged pivoting member 80 is pivotally coupled to the circuit breaker housing assembly 12 and structured to pivot between a first position and a second position. The two-legged pivoting member first leg 82 is structured to engage the movable rail obstruction element 64, preferably at the perpendicular extension 74. The two-legged pivoting member second leg 84 is structured to engage the at least one second component 54 as described below. When the two-legged pivoting member 80 is in said first position, the movable rail obstruction element 64 is in the first position and when the said two-legged pivoting member 80 is in the second position, the movable rail obstruction element 64 is in the second position.

The interlock at least one second component 54 preferably includes a horizontal, planar member 90 coupled to the circuit breaker extraction device rail 32. The horizontal member 90 is structured to engage the at least one first component 52 when said circuit breaker extraction device rails 32 are brought adjacent and parallel to the circuit breaker housing assembly rails 28. In a more preferred embodiment, the horizontal planar member 90 is structured to engage the perpendicular extension angled lower edge 78. Generally, the horizontal planar member 90 may be a horizontally flat bar coupled to the circuit breaker extraction device rail 32.

There is, preferably, one interlock assembly 50 on each side of the circuit breaker housing assembly 12 and circuit breaker extraction device 14. In operation, when the circuit breaker extraction device rails 32 are aligned with, and adjacent to, the circuit breaker housing assembly rails 28, each interlock second component 54 engages a first component 52 causing each movable rail obstruction element 64 to move vertically, that is, into the second position. In the second position, rail wheels 18 of a circuit breaker 16 may pass through the interlock assembly 50 thereby allowing the circuit breaker 16 to be removed from, or installed into, the circuit breaker housing assembly 12.

The interlock assembly 50 may also include a lock assembly 100 structured to hold the circuit breaker extraction device rails 32 and the circuit breaker housing assembly rails 28 in an aligned and immediately adjacent configuration. The lock assembly 100 includes a first lock assembly component 102, a second lock assembly component 104 and a removable member 106. The first lock assembly component 102 includes an opening 103 in the circuit breaker housing assembly frame assembly 22 adjacent to the circuit breaker housing assembly rail 28. The second lock assembly component 104 includes a vertical bar member 108 attached to a side of said circuit breaker extraction device rail 32 and which extends beyond the distal end of the circuit breaker extraction device rail 32. The vertical bar member 108 has an opening 105. The removable member 106 is preferably a pin 110 that may be held in place by a cotter pin 112. In this configuration, when the circuit breaker extraction device rails 32 are brought adjacent and parallel to the circuit breaker housing assembly rails 28, the vertical bar member opening 105 aligns with the circuit breaker housing assembly frame assembly opening 103 and wherein the pin 110 may be inserted through said vertical bar member opening 105 and said circuit breaker housing assembly frame assembly opening 103 thereby locking said circuit breaker extraction device 14 to said circuit breaker housing assembly 12.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An interlock assembly for a circuit breaker housing assembly and a circuit breaker extraction device, wherein said circuit breaker housing assembly includes a frame assembly and a plurality of walls forming an enclosure and, disposed within said enclosure, a pair of generally parallel rails structured to support a roll-out circuit breaker, and said circuit breaker extraction device includes a frame assembly structured to be mobile and having a pair of generally parallel rails spaced to align with said circuit breaker housing assembly rails, said circuit breaker extraction device rails each having a distal end, wherein said interlock assembly comprises:
  at least one first component coupled to said circuit breaker housing assembly and at least one second component coupled to said circuit breaker extraction device;
  said at least one first component comprising a rail obstruction assembly disposed adjacent to at least one said circuit breaker housing assembly rail, said rail obstruction assembly having a fixed mount coupled to said circuit breaker housing assembly and a movable rail obstruction element movably coupled to said fixed mount, said movable rail obstruction element structured to move between a first position, wherein said movable rail obstruction element blocks a wheel from traveling over said at least one circuit breaker housing assembly rail, and a second position, wherein said movable rail obstruction element is spaced from said at least one circuit breaker housing assembly rail and wherein a circuit breaker wheel may travel over said at least one circuit breaker housing assembly rail;
  said at least one second component is disposed on a circuit breaker extraction device rail and is structured to engage said at least one first component when said circuit breaker extraction device rails are brought adjacent and parallel to said circuit breaker housing assembly rails and to move said movable rail obstruction element from said first position to said second position.

2. The interlock assembly of claim 1 wherein said at least one first component and at least one second component includes two first components and two second components, and wherein one first component is disposed adjacent to each said circuit breaker housing assembly rail and one said second component is disposed on each circuit breaker extraction device rail.

3. The interlock assembly of claim 1 wherein said rail obstruction assembly includes a return device structured to bias said movable rail obstruction element to said first position.

4. The interlock assembly of claim 1 wherein said movable rail obstruction element is structured to move vertically.

5. The interlock assembly of claim 4 wherein said rail obstruction assembly includes a return device structured to bias said movable rail obstruction element to said first position.

6. The interlock assembly of claim 4 wherein said movable rail obstruction element includes an elongated planar member having a lateral extension and a perpendicular extension with an angled edge, said lateral extension structured to extend over said circuit breaker housing assembly rail and said perpendicular extension with an angled edge structured to be engaged by said at least one second component; and
  said second component includes a planar member coupled to said circuit breaker extraction device rail, said planar member structured to engage said perpendicular extension with an angled edge.

7. The interlock assembly of claim 4 wherein:
  said rail obstruction assembly includes a two-legged pivoting member having a first leg and a second leg;
  said two-legged pivoting member pivotally coupled to said circuit breaker housing assembly and structured to pivot between a first position and a second position;
  said two-legged pivoting member first leg structured to engage said movable rail obstruction element;
  said two-legged pivoting member second leg structured to engage said at least one second component; and
  wherein when said two-legged pivoting member is in said first position, said movable rail obstruction element is in said first position and when said two-legged pivoting member is in said second position, said movable rail obstruction element is in said second position.

8. The interlock assembly of claim 7 wherein:
  said movable rail obstruction element includes an elongated planar member having a lateral extension and an perpendicular extension with an angled edge, said lateral extension structured to extend over said circuit breaker housing assembly rail and said perpendicular extension with an angled edge structured to be engaged by said two-legged pivoting member first leg; and
  said second component includes a planar member coupled to said circuit breaker extraction device rail, said planar member structured to engage said two-legged pivoting member second leg.

9. The interlock assembly of claim 4 wherein said first component and said second component include a lock assembly structured to hold said circuit breaker extraction device rails and said circuit breaker housing assembly rails in an aligned and immediately adjacent configuration.

10. The interlock assembly of claim 9 wherein:
  said first component lock assembly includes an opening in said circuit breaker housing assembly frame assembly adjacent to said circuit breaker housing assembly rail;
  said second component lock assembly includes a vertical bar member attached to a side of said circuit breaker extraction device rail and which extends beyond the distal end of said circuit breaker extraction device rail, said vertical bar member having an opening, and a pin; and
  wherein when said circuit breaker extraction device rails are brought adjacent and parallel to said circuit breaker housing assembly rails, said vertical bar member opening aligns with said circuit breaker housing assembly frame assembly opening and wherein said pin may be inserted through said vertical bar member opening and said circuit breaker housing assembly frame assembly opening thereby locking said circuit breaker extraction device to said circuit breaker housing assembly.

11. A circuit breaker removal and insertion assembly comprising:
  a circuit breaker housing assembly having a frame assembly and a plurality of walls forming an enclosure and, disposed within said enclosure, a pair of generally parallel rails structured to support a roll-out circuit breaker;
  a circuit breaker extraction device having a frame assembly structured to be mobile and having a pair of generally parallel rails spaced to align with said circuit breaker housing assembly rails, said circuit breaker extraction device rails each having a distal end; and an interlock assembly comprising:
  at least one first component coupled to said circuit breaker housing assembly and at least one second component coupled to said circuit breaker extraction device;
  said at least one first component comprising a rail obstruction assembly disposed adjacent to at least one said circuit breaker housing assembly rail, said rail obstruction assembly having a fixed mount coupled to said circuit breaker housing assembly and a movable rail obstruction element movably coupled to said fixed mount, said movable rail obstruction element structured to move between a first position, wherein said movable rail obstruction element blocks a wheel from traveling over said at least one circuit breaker housing assembly rail, and a second position, wherein said movable rail obstruction element is spaced from said at least one circuit breaker housing assembly rail and wherein a wheel may travel over said at least one circuit breaker housing assembly rail; and
  said at least one second component is disposed on a circuit breaker extraction device rail and is structured to engage said at least one first component when said circuit breaker extraction device rails are brought adjacent and parallel to said circuit breaker housing assembly rails and to move said movable rail obstruction element from said first position to said second position.

12. The circuit breaker removal and insertion assembly of claim 11 wherein said at least one first component and at least one second component includes two first components and two second components, and wherein one first component is disposed adjacent to each said circuit breaker housing assembly rail and one said second component is disposed on each circuit breaker extraction device rail.

13. The circuit breaker removal and insertion assembly of claim 11 wherein said rail obstruction assembly includes a return device structured to bias said movable rail obstruction element to said first position.

14. The circuit breaker removal and insertion assembly of claim 11 wherein said movable rail obstruction element is structured to move vertically.

15. The circuit breaker removal and insertion assembly of claim 14 wherein said rail obstruction assembly includes a return device structured to bias said movable rail obstruction element to said first position.

16. The circuit breaker removal and insertion assembly of claim 14 wherein said movable rail obstruction element includes an elongated planar member having a lateral extension and an perpendicular extension with an angled edge, said lateral extension structured to extend over said circuit breaker housing assembly rail and said perpendicular extension with an angled edge structured to be engaged by said at least one second component; and
  said second component includes a planar member coupled to said circuit breaker extraction device rail, said planar member structured to engage said perpendicular extension with an angled edge.

17. The circuit breaker removal and insertion assembly of claim 14 wherein:
  said rail obstruction assembly includes a two-legged pivoting member having a first leg and a second leg;
  said two-legged pivoting member pivotally coupled to said circuit breaker housing assembly and structured to pivot between a first position and a second position;
  said two-legged pivoting member first leg structured to engage said movable rail obstruction element;
  said two-legged pivoting member second leg structured to engage said at least one second component; and
  wherein when said two-legged pivoting member is in said first position, said movable rail obstruction element is in said first position and when said two-legged pivoting member is in said second position, said movable rail obstruction element is in said second position.

18. The circuit breaker removal and insertion assembly of claim 17 wherein:
  said movable rail obstruction element includes an elongated planar member having a lateral extension and a perpendicular extension with an angled edge, said lateral extension structured to extend over said circuit breaker housing assembly rail and said perpendicular extension with an angled edge structured to be engaged by said two-legged pivoting member first leg; and
  said second component includes a planar member coupled to said circuit breaker extraction device rail, said planar member structured to engage said two-legged pivoting member second leg.

19. The circuit breaker removal and insertion assembly of claim 14 wherein said first component and said second component include a lock assembly structured to hold said circuit breaker extraction device rails and said circuit breaker housing assembly rails in an aligned and immediately adjacent configuration.

20. The circuit breaker removal and insertion assembly of claim 19 wherein:
  said first component lock assembly includes an opening in said circuit breaker housing assembly frame assembly adjacent to said circuit breaker housing assembly rail;
  said second component lock assembly includes a vertical bar member attached to a side of said circuit breaker extraction device rail and which extends beyond the distal end of said circuit breaker extraction device rail, said vertical bar member having an opening, and a pin; and
  wherein when said circuit breaker extraction device rails are brought adjacent and parallel to said circuit breaker housing assembly rails, said vertical bar member opening aligns with said circuit breaker housing assembly frame assembly opening and wherein said pin may be inserted through said vertical bar member opening and said circuit breaker housing assembly frame assembly opening thereby locking said circuit breaker extraction device to said circuit breaker housing assembly.

* * * * *